J. F. TROXEL.
Horse Hay-Forks.
No. 156,241.
Patented Oct. 27, 1874.
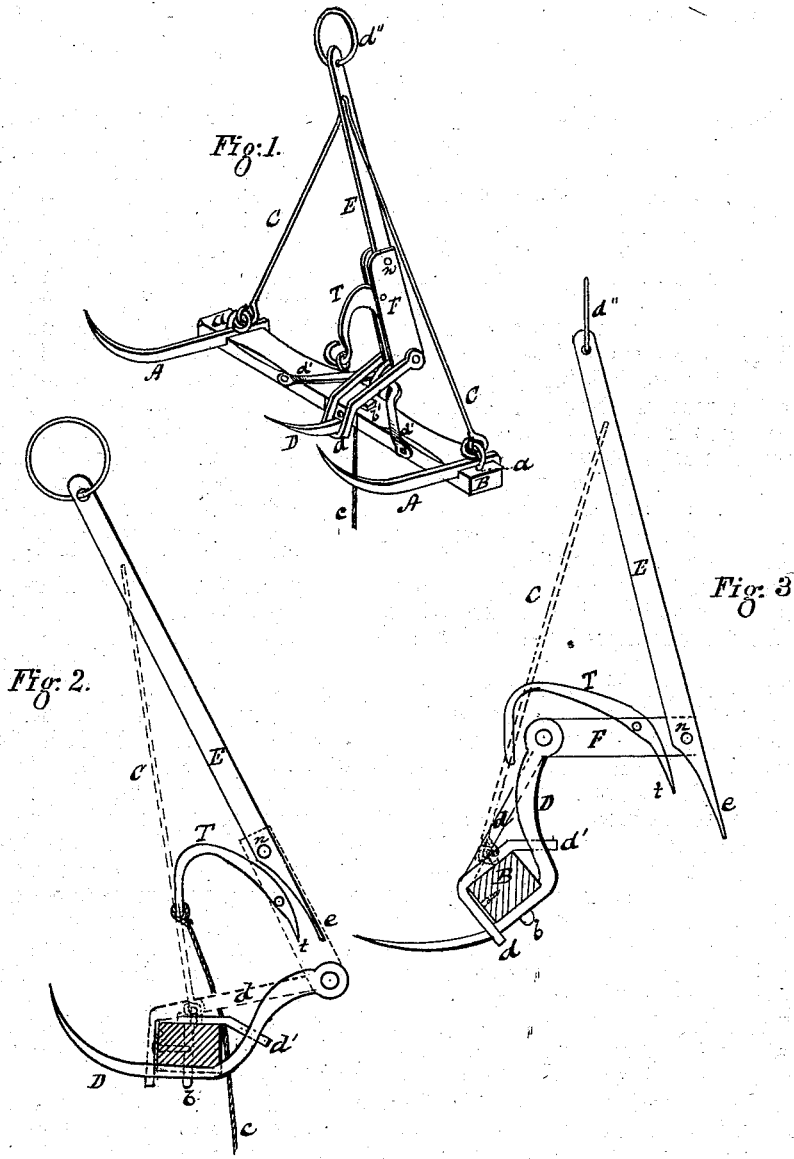

UNITED STATES PATENT OFFICE.

JACOB F. TROXEL, OF BLOOMVILLE, OHIO.

IMPROVEMENT IN HORSE HAY-FORKS.

Specification forming part of Letters Patent No. 156,241, dated October 27, 1874; application filed March 13, 1874.

*To all whom it may concern:*

Be it known that I, JACOB F. TROXEL, of Bloomville, Ohio, have invented a new and useful Improvement in Hay - Elevators, of which the following is a full, clear, and exact description, reference being had to the accompanying drawings, making a part of this specification, in which—

Figure 1 is a perspective view of my invention. Fig. 2 is a vertical section, with the elevator in position for holding the hay. Fig. 3 is a vertical section, showing the position of the parts when the hay is discharged.

My improvement relates to hay-forks, which are caused to drop the hay at any moment desired by the action of a trigger; and it consists in the combination and arrangement of parts, as hereinafter described.

To enable others skilled in the art to make and use my invention, I will proceed to describe the exact manner in which I have carried it out.

My fork is what is styled in the trade a two-tine fork. These tines A A are bent in the usual form, as shown in Fig. 1, and are made of square iron, let into the block about one-half their thickness, and, passing down the rear and under the block, are secured by the bolts $a$ $a$, the said bolts being constructed with eyes, as shown in Fig. 1, so as to perform the double function of securing the tines to the block and of forming the hinge for securing the rod C, which, being bent into the usual A shape, rests at its center in the upper part of the brace E, as shown in the drawings. The brace E at its lower end tapers, as shown at $e$ in Fig. 2, and is pivoted in the toggle-joint F at $n$. Near the center of the toggle-joint F is pivoted the trigger T, provided with the cord $c$. In the lower end of the toggle-joint, or at the end opposite to the point where the brace E is pivoted, I pivot loosely an S-shaped bar, passing under the block, as shown by D in Figs. 2 and 3. This bar D is let into the lower side of the block about one-half its own thickness, and is there secured by the bolt $b$ and nut $b'$, and projects sufficiently in front of the block to materially assist the two tines in sustaining the weight of the hay being raised. The double brace $d$ (see Fig. 1) passes around the bar D in front of the block, and then, extending over the block, runs back, and is pivoted with the bar D to the toggle-joint F, as above described. The short brace $d'$, secured to the front of the block, as shown in Fig. 1, passes over the block and around behind the bar D, (see Fig. 3,) thus securing this bar firmly in position, and preventing the block turning with the two tines while elevating a load.

The operation of the fork is as follows: When the load is on, its weight holds the fork in the position shown in Fig. 1, and in the section shown in Fig. 2. The line of strain is such that the weight on tines causes the lever-bar D to press the lower end of the toggle-joint F outside of the line of the brace E, and, as the lower end of the brace is held and prevented from passing inward by the pivot which holds the trigger T, it is evident the load on the two tines will be safely raised with the raising of the elevator. When the hay is in the desired position for discharging, the cord $c$ is pulled, which forces down the long lever-arm of the trigger T, and causes the short arm $t$ to force the lower end $e$ of the brace E outside of the line of pressure from the lever-bar D. The moment the lower end of the brace passes outside of the line of strain, it ceases to sustain the pressure from the lever-bar D, and the tines necessarily drop to the position shown in Fig. 3, and discharge the load.

Having thus described my invention, what I claim as new, and desire to secure by Letters Patent, is—

In a horse hay-fork having two tines, the combination of the S-shaped bar D, braces $d$ $d'$, and block B with the toggle-joint F, trigger T, and brace E, substantially as and for the purpose described.

JACOB F. TROXEL.

Witnesses:
ARTHUR ADAMS,
JOHN ANDREWS.